United States Patent
Tsuji et al.

(10) Patent No.: US 11,225,248 B2
(45) Date of Patent: Jan. 18, 2022

(54) VEHICLE CONTROL APPARATUS

(71) Applicant: HONDA MOTOR CO., LTD., Tokyo (JP)

(72) Inventors: Kanta Tsuji, Wako (JP); Atsushi Ishioka, Wako (JP); Daiki Nishida, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 87 days.

(21) Appl. No.: 16/775,731

(22) Filed: Jan. 29, 2020

(65) Prior Publication Data
US 2020/0255007 A1 Aug. 13, 2020

(30) Foreign Application Priority Data
Feb. 8, 2019 (JP) .............................. JP2019-021799

(51) Int. Cl.
*B60W 30/12* (2020.01)
*B62D 6/00* (2006.01)
*G05D 1/00* (2006.01)

(52) U.S. Cl.
CPC ......... *B60W 30/12* (2013.01); *B60W 2420/42* (2013.01); *B60W 2420/52* (2013.01); *B62D 6/00* (2013.01); *G05D 1/0088* (2013.01)

(58) Field of Classification Search
CPC ............ B60W 30/12; B60W 2420/52; B60W 2420/42; B60W 2554/00; B60W 2540/18; B60W 2710/20; B60W 50/10; B60W 50/16; B60W 60/001; B62D 6/00; B62D 15/0255; B62D 15/025; B62D 6/008; G05D 1/0088
See application file for complete search history.

(56) References Cited

U.S. PATENT DOCUMENTS

| | | | |
|---|---|---|---|
| 10,065,639 B2* | 9/2018 | Taniguchi | ............. B60W 30/12 |
| 10,310,503 B2* | 6/2019 | Oyama | ................. G05D 1/0251 |
| 10,386,838 B2 | 8/2019 | Kumakiri et al. | |
| 10,996,671 B2* | 5/2021 | Zaizen | .................. B60W 30/10 |
| 2017/0351256 A1* | 12/2017 | Kumakiri | ............. G05D 1/0061 |
| 2018/0273026 A1* | 9/2018 | Oyama | ................. B60W 10/20 |
| 2020/0023884 A1* | 1/2020 | Mizoo | ...................... B62D 6/00 |

(Continued)

FOREIGN PATENT DOCUMENTS

JP 2017-218020 A 12/2017

*Primary Examiner* — Thomas Ingram
(74) *Attorney, Agent, or Firm* — Thomas | Horstemeyer, LLP

(57) ABSTRACT

A vehicle control apparatus comprises a setting unit that sets a target position within a lane currently being traveled, and a steering controller that carries out steering control based on the target position. The steering controller can accept a steering input resulting from a manual operation, even when steering control is being carried out, generates a counterforce against the manual operation, and controls steering counterforce characteristics so that when the target position is distanced, in a width direction, from a first reference position near the center of the lane, the steering counterforce against a manual operation in a first direction from the target position toward the first reference position is lower than the steering counterforce against a manual operation in a second direction different from the first direction with respect to a manual operation at a given steering angle.

5 Claims, 8 Drawing Sheets

(56) References Cited

U.S. PATENT DOCUMENTS

2020/0031344 A1* 1/2020 Okano ................. B62D 15/025
2020/0269908 A1* 8/2020 Sekiya ................. B62D 15/021
2021/0061271 A1* 3/2021 Omikawa ............. B60W 10/20

* cited by examiner

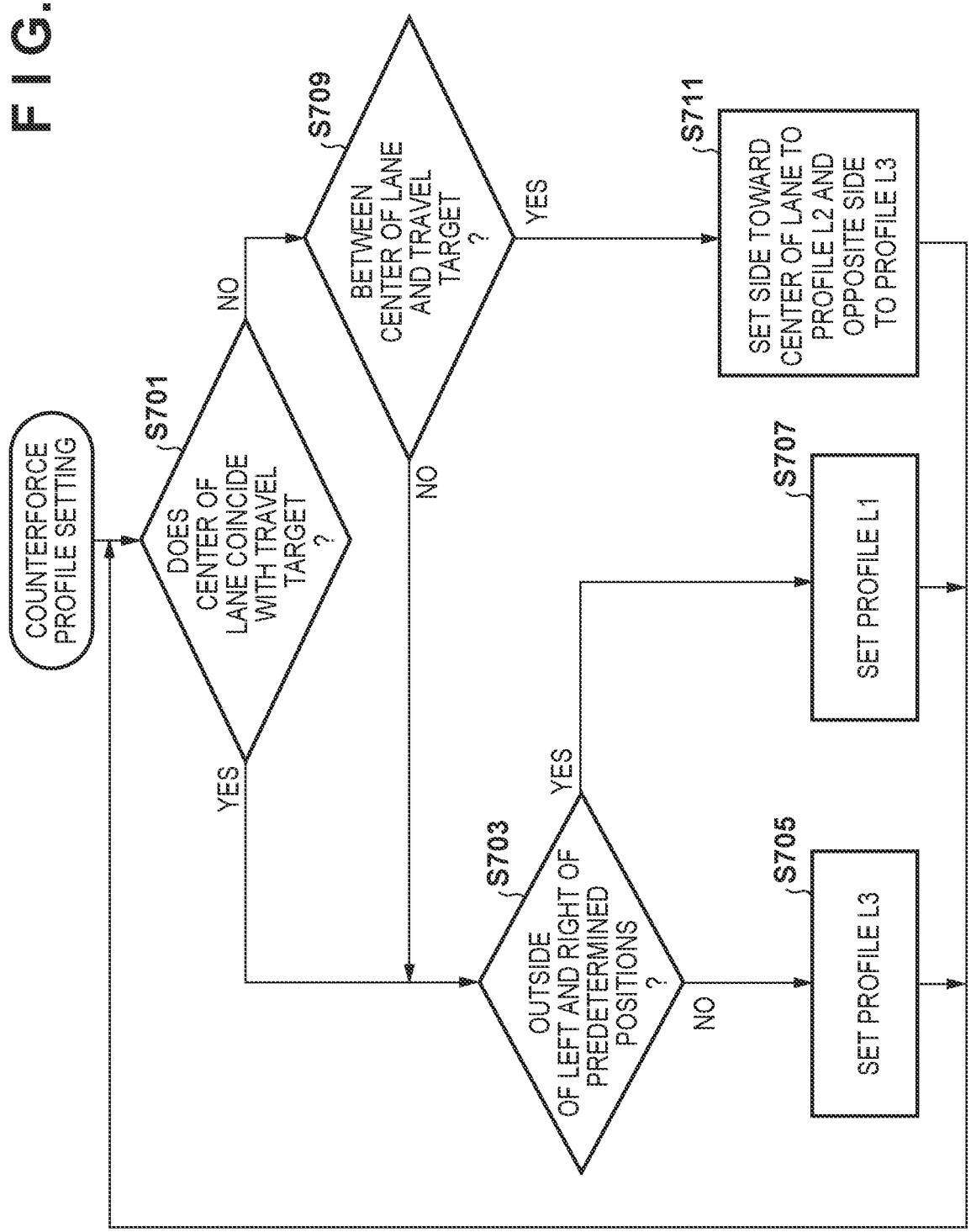

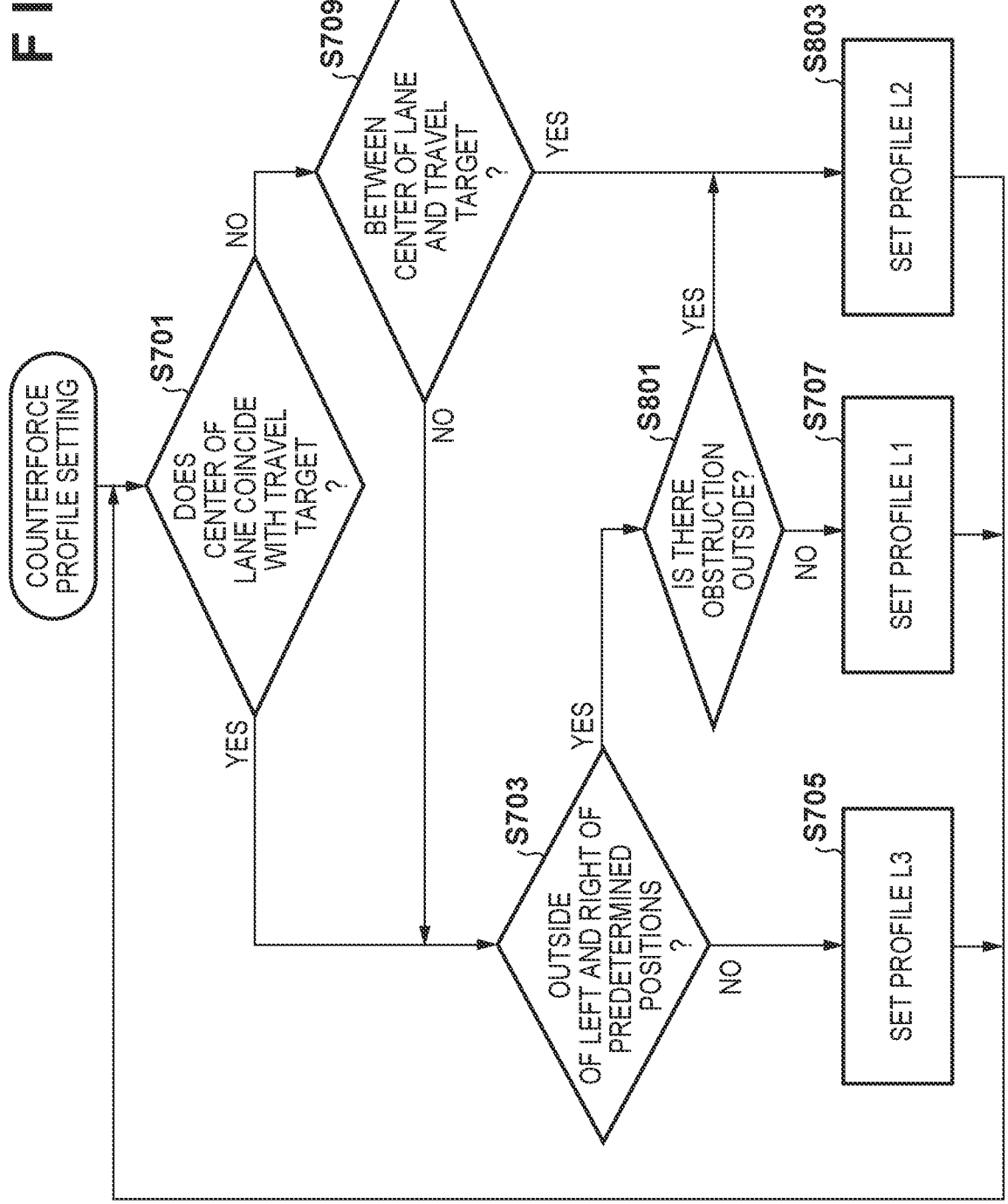

VEHICLE CONTROL APPARATUS

CROSS-REFERENCE TO RELATED APPLICATION

This application claims priority to and the benefit of Japanese Patent Application No. 2019-021799 filed on Feb. 8, 2019, the entire disclosure of which is incorporated herein by reference.

BACKGROUND OF THE INVENTION

Field of the Invention

The present invention relates to a vehicle control apparatus for carrying out automated driving, driving assistance, and the like for an automobile, for example.

Description of the Related Art

In automated driving or driving assistance for a vehicle such as a four-wheeled vehicle, a specific direction or all directions of the vehicle are monitored using sensors, and the state of the driver, the travel state of the vehicle, and so on are monitored; and based on the monitoring results, the automated driving of the vehicle is controlled so as to travel along an appropriate route and at an appropriate speed, or the driver is assisted in driving the vehicle. Even a vehicle having such an automated driving function requires the driver to be responsible for the driving, or situations and circumstances where such is the case can arise. In such a case, during automated driving, the driver can take intervene in the driving manually. Japanese Patent Laid-Open No. 2017-218020 and others have been proposed as techniques for achieving both automated driving and manual driving by a driver in this manner. In Japanese Patent Laid-Open No. 2017-218020, an automated driving control state of a vehicle is switched from automated driving to manual driving based on an operation amount of a steering wheel, and a steering counterforce for steering based on the automated driving control state is set in accordance with a steering wheel grip state of the driver.

In automated driving, a target trajectory on which the vehicle is to travel is determined, and control is carried out so that the vehicle travels along that trajectory. That travel target trajectory normally follows the center of the lane, but a trajectory outside the center of the lane is sometimes selected instead. For example, the vehicle may turn along a curve, e.g., when there is an obstruction on the shoulder, when passing a vehicle traveling in an adjacent lane, and so on. This so-called "offset travel", which deviates from the center of the lane, is carried out not only to avoid obstructions, but also in cases where the center of the lane can be traveled without impediments. This is done, for example, to alleviate a sense of panic or unease on the part of the driver or passengers when approaching an obstruction or another vehicle, to improve comfort when traveling through a curve, or the like. Offset travel is not absolutely necessary in such cases, however, and some drivers prefer to travel in the center of the lane.

However, a vehicle in the middle of automated driving may treat driver operations for deviating from the automatically-selected travel trajectory as undesirable and carry out control which obstructs such operations. The control therefore works to obstruct deviations from automated driving, even for driver operations that may be permitted.

SUMMARY OF THE INVENTION

The present invention provides a vehicle control apparatus that appropriately balances automated driving with manual driving by a driver that intervenes with the automated driving.

The present invention has the following configuration.

That is, one aspect of the present invention provides a vehicle control apparatus that carries out driving assistance or automated driving of a self-vehicle. The apparatus includes a setting unit that, on the basis of a result of monitoring the surroundings, sets a target position, the target position being a travel route within a lane currently being traveled, and a steering control unit that carries out steering control on the basis of the target position. The steering control unit: can accept a steering input resulting from a manual operation made by a driver, even when steering control is being carried out on the basis of the target position; generates a predetermined counterforce against the manual operation when the steering input has been accepted; and controls steering counterforce characteristics so that when the target position is distanced, in a width direction of the lane, from a first reference position that is near the center of the lane in which the self-vehicle is traveling, the steering counterforce against a manual operation in a first direction from the target position toward the first reference position is lower than the steering counterforce against a manual operation in a second direction different from the first direction with respect to a manual operation at a given steering angle when the steering input has been accepted.

According to the present invention, automated driving can be appropriately balanced with manual driving by a driver that intervenes with the automated driving.

BRIEF DESCRIPTION OF THE DRAWINGS

FIG. 7 is a diagram illustrating a flowchart serving as an example of a sequence for switching counterforce characteristic profiles.

FIG. 8 is a diagram illustrating a flowchart serving as another example of a sequence for switching counterforce characteristic profiles.

DESCRIPTION OF THE EMBODIMENTS

Figure 1:
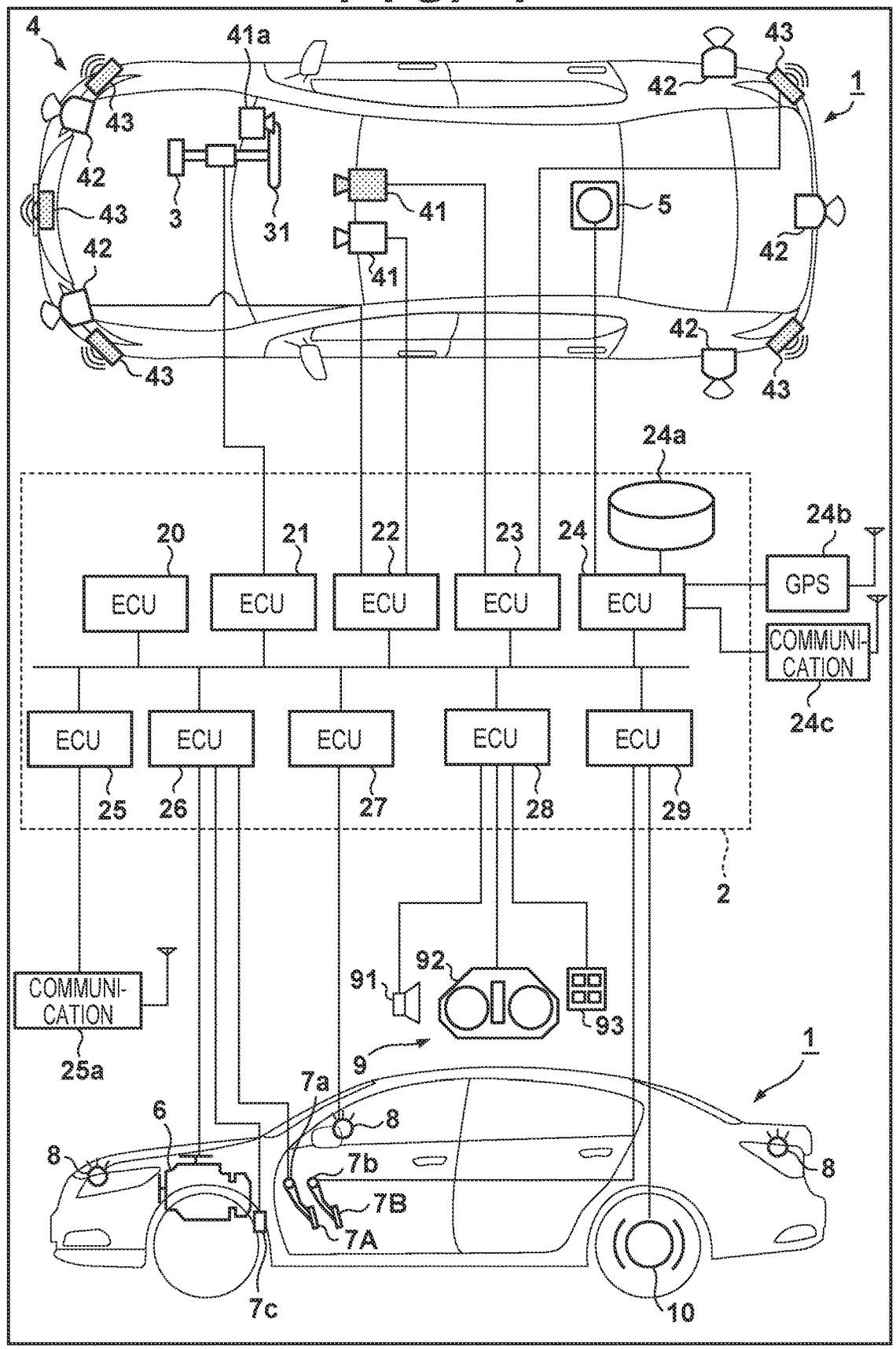
FIG. 1 is a diagram illustrating the configuration of a vehicle system in an automated driving vehicle according to embodiments.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

Overview of Automated Driving and Travel Assistance

First, an overview will be given of an example of automated driving. In automated driving, a driver typically sets their destination in a navigation system provided in the vehicle before travel, and determines a route to the destination using a server, the navigation system, and so on. Once the vehicle departs, a vehicle control apparatus (or driving control apparatus) constituted by ECUs and the like provided in the vehicle drive the vehicle to the destination along the stated route. The apparatus determines the appropriate behavior at appropriate times based on the outside environment, such as the state of the route, roads, and so on, the state of the driver, and the like, and causes the vehicle to travel while carrying out drive control, steering control, braking control, and the like to realize the stated behavior. These types of control may be referred to collectively as "travel control".

Automated driving provides several control states (called "automated driving control states" or simply "states") depending on the level of autonomy (or the number of tasks required of the driver). Generally speaking, as the level of the automated driving control state, and by extension, the level of autonomy, increases, the number of tasks required of the driver (i.e., the burden on the driver) decreases. For example, with the highest control state in this example (a level 3 control state), the driver may pay attention to things other than driving. This is carried out in environments that are not particularly complicated, such as when following a vehicle while in traffic on a highway, for example. In the next control state down, which is a level 2 control state, the driver does not need to hold the steering wheel but does need to pay attention to their surroundings. The level 2 control state is applied in situations such as when cruising on a highway where there are few obstructions, for example. Note that whether the driver is paying attention to their surroundings can be detected using a driver state detecting camera 41a (see FIG. 1), and whether the driver is holding the steering wheel can be detected using a steering wheel grip sensor. The driver state detecting camera 41a may determine the direction the driver is looking by recognizing their pupils, for example, but may also simply recognize the driver's face and estimate that the direction the driver's face is facing is the direction in which they are looking.

In a level 1 control state, which is one additional level lower, the driver need not operate the steering wheel, the accelerator, or the like, but needs to hold the steering wheel and pay attention to the traveled environment in case the vehicle hands over control of the driving to the driver. A level 0 control state, which is one additional level lower, is manual driving, but with automated driving assistance. The difference between the level 1 control state and the level 0 control state is that the level 1 control state is one automated driving control state, and can transition between the level 2 and level 3 control states under the control of a vehicle 1 in accordance with the outside environment, travel state, driver state, and so on; however, the level 0 control state remains at the level 0 control state unless the driver makes an instruction for switching to automated driving.

The aforementioned driving assistance in the level 0 control state is a function which monitors the surroundings, carries out partial automation, and so on to support the driving operations of the driver, who is in primary control of the driving. This includes LKAS (a Lane Keep Assist function), ACC (Adaptive Cruise Control), and so on, for example. There is also an automatic braking function which monitors only the forward area and applies the brakes when an obstruction is detected, a rear monitoring function which detects vehicles in blind spots and prompts the driver to use caution, a function for parking in parking spaces, and so on. All of these may be functions implemented in the level 1 control state of automated driving as well. Note that LKAS is a function which, for example, keeps the vehicle in its lane by recognizing white lines and the like on the road, whereas ACC is a function for following the vehicle in front while matching the speed of that vehicle.

Note that the driver may intervene in the driving or make corrective operations during automated driving as well. This is called "overriding". For example, when the driver operates the steering wheel, the accelerator, or the like during automated driving, the driving operations made by the driver may be prioritized. In this case, the automated driving function continues to operate so that automated driving can be resumed as soon as the driver ceases their operations. As such, it is possible that the automated driving control state will change even during an override. Meanwhile, automated driving may be canceled and switch to manual driving (the level 0 control state) in response to the driver operating the brakes. Note that with respect to steering, automated driving may be switched over to manual driving upon a steering angle, steering speed, or the like exceeding a predetermined threshold, for example.

When the automated driving control state (or the state of automation) is switched, the vehicle notifies the driver of the switch using audio, a display, vibrations, or the like. For example, when the automated driving switches from the aforementioned level 1 control state to the level 2 control state, the driver is notified that they may release the steering wheel. In the reverse situation, the driver is notified that they should take hold of the steering wheel. This notification is made repeatedly until the steering wheel grip sensor (e.g., a sensor 210I, illustrated in FIG. 3) has detected that the driver has taken hold of the steering wheel. If the driver does not take hold of the steering wheel within a time limit or by a limit point for switching the automated driving control state, for example, operations may be carried out for stopping the vehicle in a safe location or the like. Switching from the level 2 control state to the level 3 control state is similar, but in the level 3 control state, the driver is no longer required to monitor their surroundings, and thus a message to that effect is provided to the driver. In the reverse situation, the driver is notified that they should monitor their surroundings. This notification is repeated until the driver state detecting camera 41a detects that the driver is monitoring their surroundings. The automated driving is generally carried out as described thus far, and a configuration and control for realizing the automated driving will be described below.

Configuration of Vehicle Control Apparatus

FIG. 1 is a block diagram illustrating a vehicle control apparatus according to an embodiment of the present invention, the apparatus controlling the vehicle 1. An overview of the vehicle 1 is illustrated in FIG. 1, both as a plan view and as a side view. The vehicle 1 is, for example, a sedan-type four-wheeled passenger vehicle.

The control apparatus illustrated in FIG. 1 includes a control unit 2. The control unit 2 includes a plurality of ECUs 20 to 29, which are communicatively connected over an in-vehicle network. Each ECU includes a processor such as a CPU, a storage device such as semiconductor memory, an interface with external devices, and the like. The storage device stores programs executed by the processor, the data used in processing by the processor, and so on. Each ECU may include a plurality of processors, storage devices, interfaces, and so on.

Functions and the like handled by the ECUs 20 to 29 will be described hereinafter. Note that the number of ECUs, the functions handled by the ECUs, and so on can be designed as appropriate for the vehicle 1, and can be set at a finer or broader level than that described in the present embodiment.

The ECU 20 executes control pertaining to the automated driving of the vehicle 1. During automated driving, at least one of the steering and the acceleration/deceleration of the vehicle 1 is automatically controlled. Both the steering and the acceleration/deceleration are automatically controlled in a control example described later.

The ECU 21 is a steering ECU that controls a steering apparatus 3. The steering apparatus 3 includes a mechanism for turning the front wheels in response to a driver making a driving operation (steering operation) on a steering wheel 31. The steering apparatus 3 is an electric power steering apparatus, and also includes a motor for assisting the turning operation or for producing drive power for automatically turning the front wheels, a sensor for detecting a steering angle, and the like. When the driving state of the vehicle 1 is automated driving, the travel direction of the vehicle 1 is controlled by the ECU 21 automatically controlling the steering apparatus 3 in accordance with instructions from the ECU 20.

The ECUs 22 and 23 control detecting units 41 to 43, which detect the surrounding conditions of the vehicle, and process information of detection results. The "surrounding conditions" are also referred to as the "surrounding state", "outside environment", and so on, and the information obtained from the detection thereof will be called "surrounding condition information", "surrounding state information", "outside environment information", or the like. The units for detecting the surrounding state and the ECUs for controlling those units will be collectively referred to as a "periphery monitoring apparatus", a "periphery monitoring unit", or the like. A detecting unit 41 is a camera that shoots images in front of the vehicle 1 (this may also be referred to as a "camera 41" hereinafter), and in the present embodiment, two are provided within the cabin of the vehicle 1. By analyzing the images captured by the cameras 41, the contours of objects can be extracted, lane dividing lines on the road (white lines and the like) can be extracted, and so on. The driver state detecting camera 41a is a camera for detecting the state of the driver (also called a "detecting unit 41a" hereinafter), which is installed so as to capture the driver's expression, and is connected to an ECU (not shown) for processing the resulting image data. The steering wheel grip sensor (not shown) is another sensor for detecting the state of the driver. This makes it possible to detect whether or not the driver is holding the steering wheel. Together, the driver state detecting camera 41a and the steering wheel grip sensor 210I will also be referred to as a "driver state detecting unit".

A detecting unit 42 is LiDAR (Light Detection and Ranging or Laser Imaging Detection and Ranging; also called "LiDAR 42" hereinafter), which detects objects in the periphery of the vehicle 1, measures the distances to those objects, and so on. In the present embodiment, five of the LiDAR 42 are provided: one on each front corner of the vehicle 1, one in the rear center, and one each on the rear sides of the vehicle 1. A detecting unit 43 is millimeter wave radar (also called "radar 43" hereinafter), which detects objects in the periphery of the vehicle 1, measures the distances to those objects, and so on. In the present embodiment, five of the radar 43 are provided: one in the front-center of the vehicle 1, as well as one each on the front and rear corners of the vehicle 1.

The ECU 22 controls one of the cameras 41 and each LiDAR 42, and processes information of the detection results therefrom. The ECU 23 controls the other of the cameras 41 and each radar 43, and processes information of the detection results therefrom. By providing two sets of devices that detect the surrounding conditions of the vehicle, the reliability of the detection results can be improved; furthermore, by providing different types of detecting units, i.e., cameras, LiDAR, and radar, the peripheral environment (also called the "peripheral state") of the vehicle can be analyzed in several different ways.

The ECU 24 controls a gyrosensor 5, a GPS sensor 24b, and a communication apparatus 24c, and processes information of detection results or communication results therefrom. The gyrosensor 5 detects rotational movement of the vehicle 1. The path of the vehicle 1 can be determined from the detection results from the gyrosensor 5, the wheel speed, and so on. The GPS sensor 24b detects the current position of the vehicle 1. The communication apparatus 24c communicates wirelessly with a server that provides map information, traffic information, and the like, and obtains that information. The ECU 24 can access a map information database 24a provided in the storage device, and the ECU 24 searches for routes from the current location to a destination and the like.

The ECU 25 includes a communication apparatus 25a for vehicle-to-vehicle communication. The communication apparatus 25a communicates wirelessly with other vehicles in the periphery, and exchanges information with those vehicles.

The ECU 26 controls a power plant (i.e., a travel drive power output apparatus) 6. The power plant 6 is a mechanism for outputting drive power that rotates drive wheels of the vehicle 1, and includes an engine and a transmission, for example. For example, the ECU 26 controls the output of the engine in response to a driving operation (an acceleration operation or a deceleration operation) made by the driver, detected by an operation detecting sensor (i.e., an accelerator position sensor) 7a provided in an accelerator pedal 7A, switches the gear ratio of the transmission on the basis of information such as the vehicle speed detected by a vehicle speed sensor 7c, and the like. When the driving state of the vehicle 1 is automated driving, the ECU 26 automatically controls the power plant 6 in response to instructions from the ECU 20, and controls the acceleration/deceleration of the vehicle 1. Acceleration in each direction, angular acceleration about each axis, and so on detected by the gyrosensor 5, the vehicle speed detected by the vehicle speed sensor 7c, and the like are information indicating the travel state of the vehicle, and these sensors are therefore also collectively referred to as a "travel state monitoring unit". The operation detecting sensor 7a of the accelerator pedal 7A and an operation detecting sensor 7b of a brake pedal 7B (i.e., a brake depression sensor; described later) may be included in the travel state monitoring unit, but in the present example, these will be called an "operation state detecting unit", along with detecting units for detecting the operation states of other devices (not shown).

The ECU 27 controls lights (headlights, taillights, and the like), including directional indicators 8. In the example illustrated in FIG. 1, the directional indicators 8 are provided in a front area, a rear area, and on the door mirrors of the vehicle 1.

The ECU 28 controls an input/output device 9. The input/output device 9 outputs information to the driver and accepts the input of information from the driver. An audio output apparatus 91 communicates information to the driver through audio. A display apparatus 92 communicates information to the driver by displaying images. The display apparatus 92 is disposed, for example, in front of the driver's seat, and constitutes an instrument panel and the like, for example. Although audio and a display are mentioned here, information may be communicated through vibrations, lights, or the like. The information may also be communicated using a combination of audio, a display, vibrations, and lights. Furthermore, the combinations may be varied, or the states of the notifications may be varied, in accordance with the control state (e.g., a level of urgency) of the information to be communicated. An input apparatus 93 is disposed in a position where the device can be operated by the driver, and is a group of switches for making instructions to the vehicle 1; however, an audio input apparatus may be included as well. The input apparatus 93 also includes a cancel switch for manually lowering the level of the automated driving control state. An automated driving change switch is also provided for switching from manual driving to automated driving. A driver who wishes to lower the level of the automated driving control state can lower the level by operating the cancel switch. In the present embodiment, the level can be lowered using the same cancel switch, regardless of to which level the automated driving control state is currently set.

The ECU 29 controls a braking apparatus 10, a parking brake (not shown), and the like. The braking apparatus 10 is, for example, a disk brake apparatus, provided in each of the wheels of the vehicle 1, which causes the vehicle 1 to decelerate or stop by applying resistance against the rotation of the wheels. The ECU 29 controls the operations of the braking apparatus 10 in response to a driving operation (a braking operation) made by the driver, detected by the operation detecting sensor 7b provided in the brake pedal 7B, for example. If the driving state of the vehicle 1 is automated driving, the ECU 29 controls the deceleration and stopping of the vehicle 1 by automatically controlling the braking apparatus 10 in response to instructions from the ECU 20. The braking apparatus 10, the parking brake, and the like can also be operated in order to keep the vehicle 1 in a stopped state. Furthermore, if the transmission of the power plant 6 is provided with a parking lock mechanism, that parking lock mechanism can also be operated in order to keep the vehicle 1 in a stopped state.

Vehicle Control System

Figure 2:
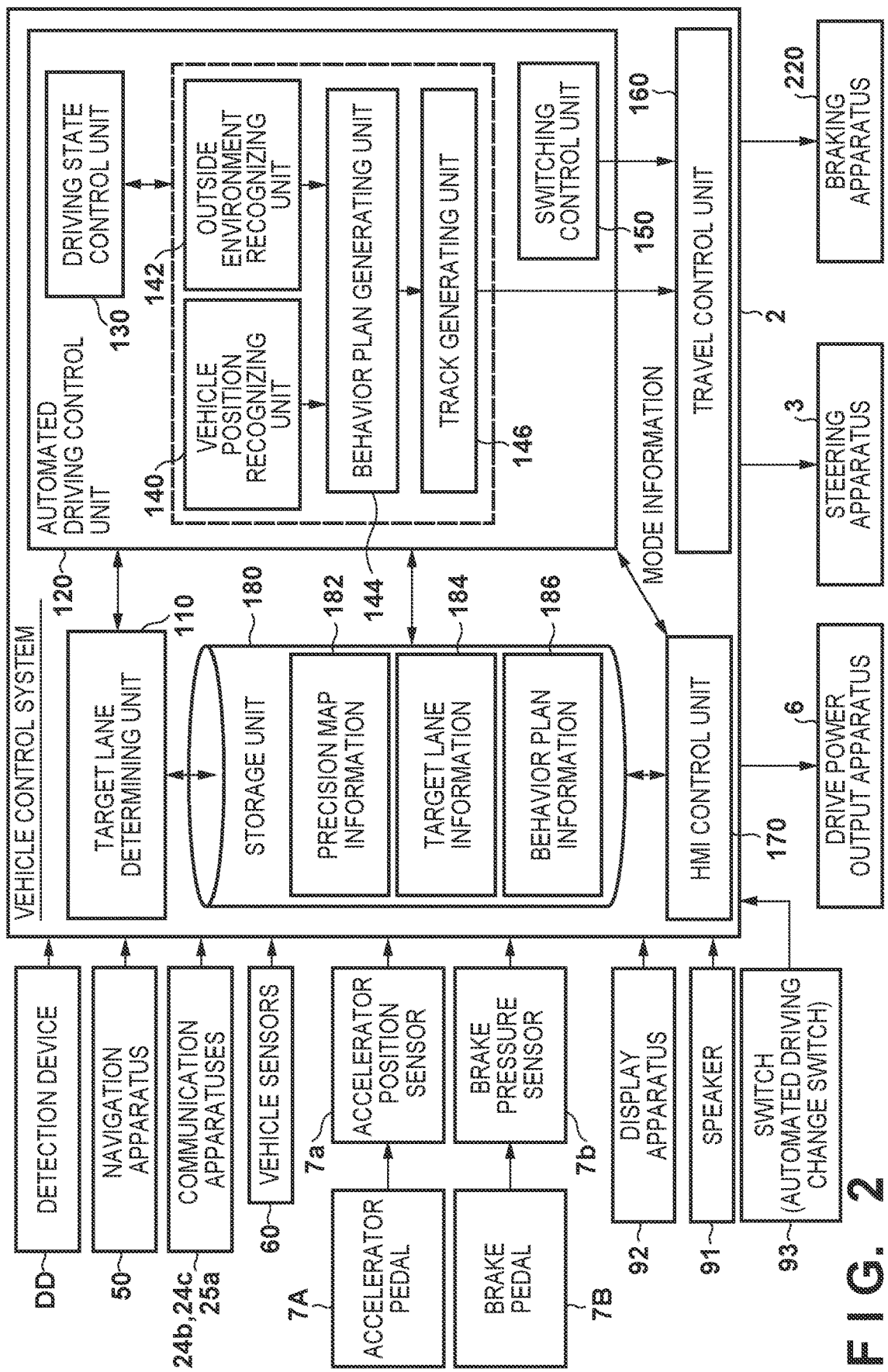
FIG. 2 is a function block diagram illustrating a vehicle control system (control unit).

FIG. 2 illustrates the functional configuration of the control unit 2 according to the present embodiment. The control unit 2 is also called a "vehicle control system", and realizes the function blocks illustrated in FIG. 2 by the ECUs, starting with the ECU 20, executing programs. In FIG. 2, the vehicle 1 includes: detection devices DD, including the cameras 41, the LiDAR 42, the radar 43, and the like; a navigation apparatus 50; communication apparatuses 24b, 24c, and 25a; vehicle sensors 60, including the gyrosensor 5, the steering wheel grip sensor, the driver state detecting camera 41a, and the like; the accelerator pedal 7A; the accelerator position sensor 7a; the brake pedal 7B; the brake depression sensor 7b; the display apparatus 92; the speaker 91; switches 93, including the automated driving change switch; the vehicle control system 2; the travel drive power output apparatus 6; the steering apparatus 3; and a braking apparatus 220. These apparatuses and devices are connected to each other by multiplex communication lines such as Controller Area Network (CAN) communication lines, serial communication lines, a wireless communication network, or the like.

The navigation apparatus 50 includes a Global Navigation Satellite System (GNSS) receiver, map information (navigation maps), a touch panel-type display apparatus that functions as a user interface, a speaker, a microphone, and the like. The navigation apparatus 50 identifies the position of the self-vehicle 1 using the GNSS receiver, and derives a route from that position to a destination designated by a user. The route derived by the navigation apparatus 50 is provided to a target lane determining unit 110 in the vehicle control system 2. Note that the configuration for identifying the position of the self-vehicle 1 may be provided separate from the navigation apparatus 50.

The communication apparatuses 24b, 24c, and 25a carry out wireless communication using a cellular network, a Wi-Fi network, Bluetooth (registered trademark), Dedicated Short-Range Communication (DSRC), and the like, for example.

The vehicle sensors 60 include a vehicle speed sensor that detects the vehicle speed, an acceleration sensor that detects acceleration, a yaw rate sensor that detects angular velocity about a vertical axis, a directional sensor that detects which direction the self-vehicle 1 is facing, and the like. All or some of these are realized by the gyrosensor 5. Furthermore, the steering wheel grip sensor, the driver state detecting camera 41a, and the like (not shown) may be included in the vehicle sensors 60.

The accelerator pedal 7A is an implement for accepting an acceleration instruction (or a deceleration instruction, using a returning operation) from the driver. The accelerator position sensor 7a detects an amount by which the accelerator pedal 7A is depressed, and outputs an acceleration position signal indicating the depression amount to the vehicle control system 2. Instead of being output to the vehicle control system 2, the signal may instead be output to the travel drive power output apparatus 6, the steering apparatus 3, or the braking apparatus 220 directly. The same applies to the other configurations in the driving operation system described hereinafter.

The brake pedal 7B is an implement for accepting a deceleration instruction from the driver. The brake depression sensor 7b detects a depression amount (or depression force) of the brake pedal 7B, and outputs a brake signal indicating the detection result to the vehicle control system 2.

The display apparatus 92 is, for example, a Liquid Crystal Display (LCD), an organic electroluminescence (EL) display apparatus, or the like attached to various parts of the instrument panel, desired locations opposite the passenger seat, a rear seat, and so on. The display apparatus 92 may also be a Heads-Up Display (HUD) which projects images onto the front windshield or other windows. The speaker 91 outputs audio.

The travel drive power output apparatus 6 outputs travel drive power (torque) to drive wheels so that the vehicle can travel. The travel drive power output apparatus 6 includes, for example, the engine, the transmission, and an engine Electronic Control Unit (ECU) that controls the engine. Note that the travel drive power output apparatus 6 may be an electric motor, a hybrid mechanism that combines an electric motor with an internal combustion engine, or the like.

The braking apparatus 220 is, for example, an electric servo braking apparatus including a brake caliper, a cylinder that transmits hydraulic pressure to the brake caliper, an electric motor that generate the hydraulic pressure in the cylinder, and a braking control unit. The braking control unit of the electric servo braking apparatus controls the electric motor in accordance with information input from a travel control unit 160, so that brake torque based on the braking operation is output to each of the wheels. The braking apparatus 220 may include a regenerative brake using a travel motor which can be included in the travel drive power output apparatus 6.

Steering Apparatus

The steering apparatus 3 will be described next. The steering apparatus 3 includes the steering ECU 21 and an electric motor, for example. The electric motor imparts a force on a rack-and-pinion mechanism to change the direction of steered wheels, for example. The steering ECU 21 drives the electric motor and changes the direction of the steered wheels in accordance with information input from the vehicle control system 2, or information of an input steering angle or steering torque.

Figure 3:
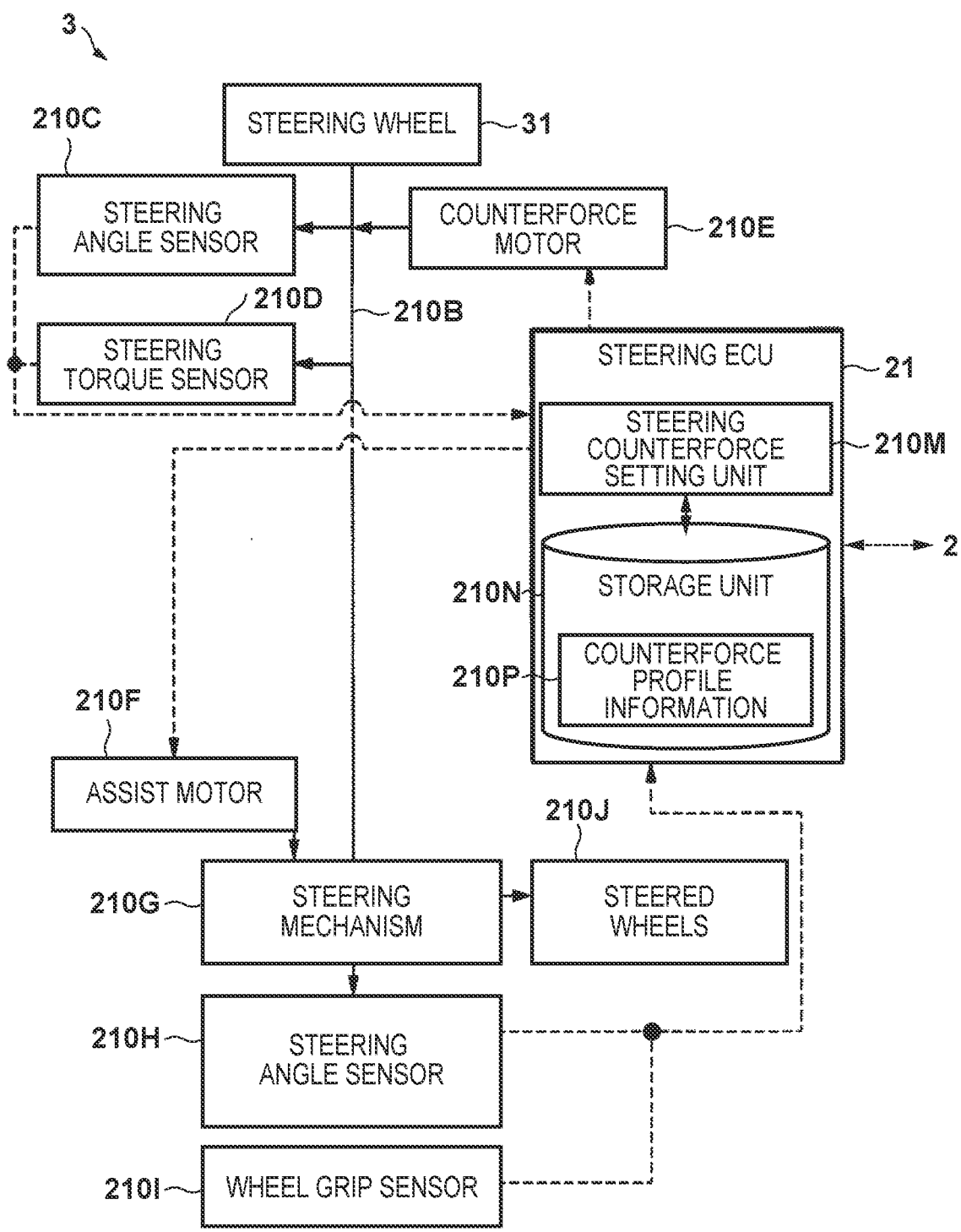
FIG. 3 is a block diagram illustrating a steering apparatus.

FIG. 3 is a diagram illustrating an example of the configuration of the steering apparatus 3 according to the present embodiment. The steering apparatus 3 may include, but is not limited to, the following: a steering wheel 31; a steering shaft 210B; a steering angle sensor 210C; a steering torque sensor 210D; a counterforce motor 210E; an assist motor 210F; a steering mechanism 210G; a steering angle sensor 210H; the steering wheel grip sensor 210I; steered wheels 210J; and the steering ECU 21. The steering ECU 21 includes a steering counterforce setting unit 210M and a storage unit 210N.

The steering wheel 31 is an example of an operation device that accepts steering instructions made by the driver. A steering input made through the steering wheel 31, i.e., a steering operation, is transmitted to the steering shaft 210B. The steering angle sensor 210C and the steering torque sensor 210D are attached to the steering shaft 210B. The steering angle sensor 210C detects the angle to which the steering wheel 31 has been manipulated and outputs that angle to the steering ECU 21. The steering torque sensor 210D detects the torque acting on the steering shaft 210B (the steering torque) and outputs that torque to the steering ECU 21. In other words, the steering torque is torque acting on the steering shaft 210B as a result of the driver turning the steering wheel 31. The counterforce motor 210E outputs a steering counterforce to the steering wheel 31 by outputting torque to the steering shaft 210B under the control of the steering ECU 21. In other words, under the control of the steering ECU 21, the counterforce motor 210E applies, to the steering shaft 210B, a predetermined steering counterforce for maintaining automated driving steering (also called "system steering") in each of the automated driving control states. The steering counterforce acts as torque working against the steering operations made by the driver. As such, when the driver wishes to override the system steering, they must apply torque to the steering shaft 210B in excess of the steering counterforce produced in accordance with the steering input.

The assist motor 210F provides steering assistance by outputting torque to the steering mechanism 210G under the control of the steering ECU 21. "Assistance" involves not only simply supporting the driver's operations during manual driving, but also steering under the control of the travel control unit 160, without any operations made by the driver, during automated driving. The steering mechanism 210G is, for example, a rack-and-pinion mechanism. The steering angle sensor 210H detects a quantity indicating an angle (steering angle) to which the steering mechanism 210G has driven and controlled the steered wheels 210J (e.g., a rack stroke), and outputs that quantity to the steering ECU 21. The steering shaft 210B and the steering mechanism 210G may be linked in a fixed manner, may be separated, or may be linked via a clutch mechanism or the like.

The steering wheel grip sensor 210I is provided in a predetermined position of a rim part of the steering wheel 31, and may be an electrostatic capacitance sensor that detects changes in electrostatic capacitance produced by the driver's hand when the driver grips the rim of the steering wheel 31. Alternatively, the sensor may be a pressure sensor that measures pressure applied to the rim when the driver grips the rim (also called "grip force" hereinafter). The steering wheel grip sensor 210I outputs the measured grip force to the steering ECU 21. The steering ECU 21 carries out the various types of control describe above in tandem with the vehicle control system 2.

During an automated driving control state, the steering counterforce setting unit 210M refers to counterforce profile information 210P in the storage unit 210N of the steering ECU 21, using, as an index value for steering input, the difference between the steering angle (override steering angle) detected by the steering angle sensor 210C and a system steering angle obtained from the vehicle control system 2 (e.g., a steering angle determined by the travel control unit 160). The counterforce profile information 210P is configured, for example, as a counterforce table expressing the correspondence relationships between steering counterforces, and the steering angle differences between the override steering angle and the system steering angle. The steering counterforce setting unit 210M then loads the steering counterforce corresponding to the steering angle difference from the counterforce table of the counterforce profile information 210P in the storage unit 210N. On the basis of the value loaded from the storage unit 210N by the steering counterforce setting unit 210M, the steering ECU 21 drives and controls the counterforce motor 210E so as to apply the steering counterforce corresponding to that value to the steering shaft 210B. Note that during a manual driving control state, predetermined counterforce profile information for manual driving is prepared, and counterforces are applied in accordance therewith. In the present example, if the steering shaft 210B is connected to the steering mechanism 210G, mechanical counterforce from the steered wheels 210J is transmitted to the steering wheel 31, and thus no particular counterforce need be applied. However, if a complete steer-by-wire system, in which the steering shaft is not mechanically connected to the steering mechanism 210G, is implemented, counterforce may be generated in accordance with a counterforce profile which simulates mechanical counterforce in order to give the driver a sense of a feeling of steering. In the present example, the counterforce is applied so as to have characteristics corresponding to the automated driving control state of the automated driving. The setting of the counterforce will be described again with reference to FIGS. 3 to 9. Note also that the steering angle, torque, speed, and so on of the steering may be collectively called a "steering quantity", and a steering quantity determined by the travel control unit 160 may be called a "system steering quantity".

According to the configuration described thus far, the steering counterforce is applied to the steering wheel 31 in accordance with the difference between the system steering angle and the steering angle of an override operation made by the driver on the steering wheel 31 in the automated driving control state, and in accordance with the automated driving control state. At this time, a greater counterforce is used for higher automated driving control state levels. Doing so makes it more difficult to override the operations as the automated driving control state level increases, and easier to override the operations as the automated driving control state level decreases, based on the automated driving control state.

In an automated driving control state, the steering counterforce setting unit 210M refers to the counterforce profile information 210P in the storage unit 210N each time the steering ECU 21 loads the system steering angle and the override steering angle. The steering counterforce setting unit 210M then reads the steering counterforce in accordance with the difference between the loaded system steering angle and the override steering angle, and the automated driving control state, and outputs a control signal to the counterforce motor 210E for imparting that steering counterforce.

Vehicle Control System (Cont'd)

Returning to FIG. 2, the vehicle control system 2 includes, for example, the target lane determining unit 110, an automated driving control unit 120, the travel control unit 160, a Human Machine Interface (HMI) control unit 170, and a storage unit 180. The automated driving control unit 120 includes, for example, an automated driving state control unit 130, a self-vehicle position recognizing unit 140, an outside environment recognizing unit 142, a behavior plan generating unit 144, a track generating unit 146, and a switching control unit 150. The target lane determining unit 110, the units in the automated driving control unit 120, the travel control unit 160, and the HMI control unit 170 may be partially or completely realized by a processor executing programs (software). These units may also be partially or completely realized by hardware such as Large Scale Integration (LSI) circuits, Application Specific Integrated Circuits (ASIC), or the like, or may be realized by a combination of software and hardware.

The storage unit 180 holds information such as high-precision map information 182, which includes information of the centers of lanes, information of the boundaries of lanes, and the like, as well as target lane information 184, behavior plan information 186, and so on. The target lane determining unit 110 divides a route provided by the navigation apparatus 50 into a plurality of blocks (e.g., makes a division every 100 m in the vehicle travel direction), and determines a target lane for each of the blocks by referring to the high-precision map information 182. The target lane determining unit 110 makes the determination so as to travel, for example, in a lane a certain number of spaces from the left. If, for example, there are fork areas, merging areas, or the like on the route, the target lane determining unit 110 determines the target lane so that the self-vehicle 1 can travel along a logical travel route for proceeding beyond the fork. The target lane determined by the target lane determining unit 110 is stored in the storage unit 180 as the target lane information 184.

Figure 4:
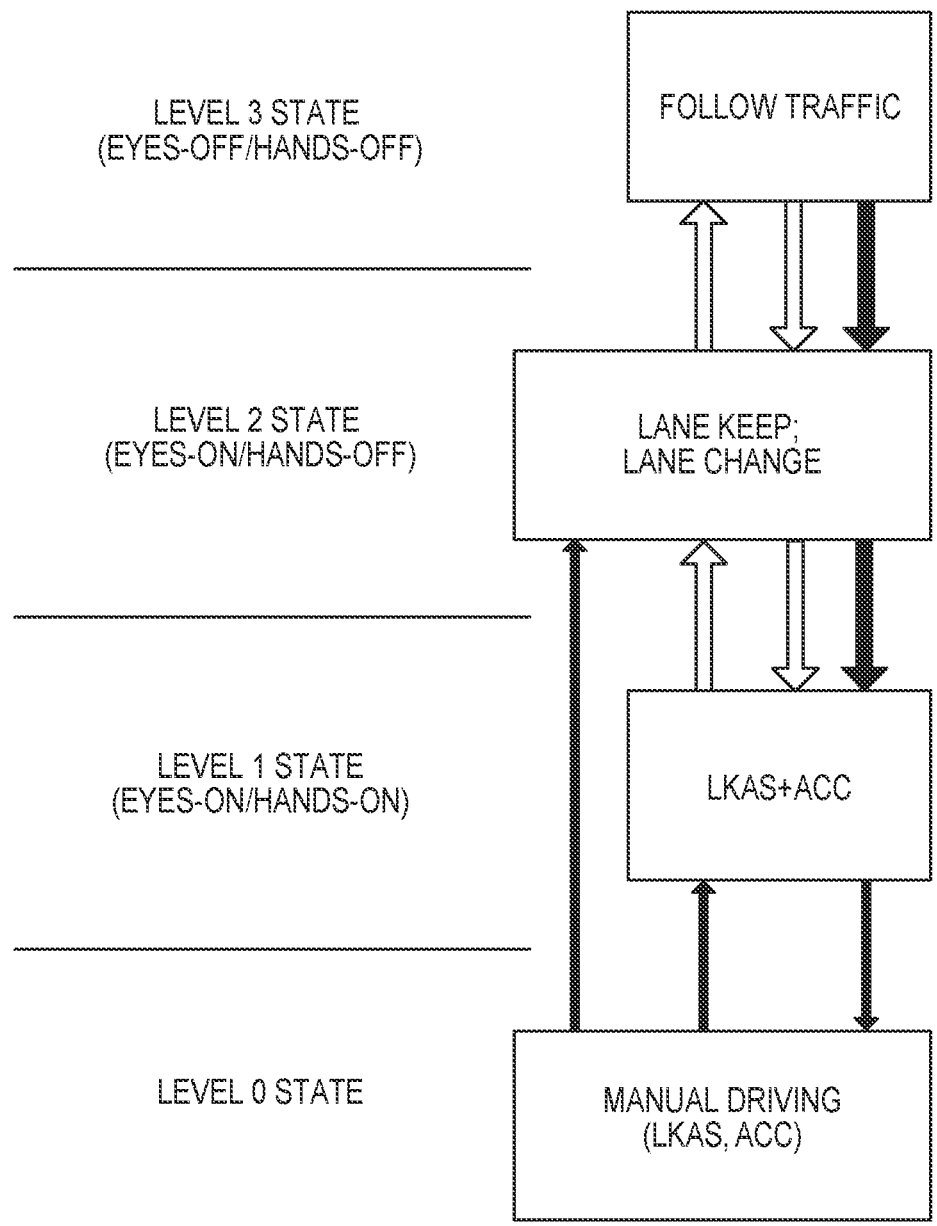
FIG. 4 is a state transition diagram illustrating transitions in automated driving states according to a first embodiment.

The automated driving state control unit 130 determines the automated driving control state of the automated driving carried out by the automated driving control unit 120 (also called an "automation state", in accordance with the level of automation in each state). The following control states are included in the automated driving control states according to the present embodiment. Note that the following are merely examples, and the number of automated driving control states may be determined as desired. FIG. 4 is a diagram illustrating automated driving control state transitions.

Automated Driving Control State Transitions

As illustrated in FIG. 4, the automated driving control states according to the present embodiment include the level 0 control state to the level 3 control state, and the level of automation increases in that order. Note that in FIG. 4, the arrows indicate the state transitions. Of these, the white arrows indicate transitions in the automated driving control state resulting from automated driving realized by the vehicle control system 2 (and the ECU 20 in particular) executing programs, for example, or in other words, realized by the vehicle 1. On the other hand, the black arrows indicate transitions in the automated driving control state made in response to driver operations. The automated driving control states will be described again here.

The level 0 control state is a control state for manual driving, and the level 0 control state is a control state in which there is no driving assistance whatsoever and it is therefore necessary for the driver to drive manually. If, in the level 0 control state, the driver operates a switch, for example, to make an explicit instruction for automated driving, the automated driving control state transitions to the level 1 control state or the level 2 control state in accordance with the conditions at that time, e.g., the outside environment, vehicle information, and the like. Which control state to switch to is determined by the control unit 2 referring to the outside environment information, travel state information, and so on.

The level 1 control state is the lowest automated driving control state in automated driving (i.e., has the lowest level of autonomy). If, when automated driving has been instructed, the current location cannot be recognized, for example, or if the current location can be recognized but the environment is not one in which the level 2 control state can be applied (e.g., a local road), the automated driving is started in the level 1 control state. The automated functions that can be implemented in the level 1 control state include LKAS, ACC, and so on. Additionally, when transitioning to the level 1 control state, the driver state detecting unit may detect whether the driver is monitoring the outside, and particularly the area to the front, and whether the driver is gripping the steering wheel. In this case, the transition is made when the conditions are met. The driver may continue to be monitored in this manner while the vehicle remains at the level 1 control state. Note that when the automated driving control state is transitioned from a lower level to a higher level, the same amount of, or fewer, tasks are required of the driver, and thus the state of the driver need not be used as a condition for the transition. Note that the difference between the level 0 control state and the level 1 control state is not limited to that described above; for example, a case is possible where only one of LKAS and ACC can be used in the level 0 control state, whereas both can be used in the level 1 control state. A case is also possible where in the level 1 control state, a broader range of operational scenes are employed for LKAS and ACC than in the level 0 control state.

The level 2 control state is the automated driving control state directly above the level 1 control state. For example, if an instruction for automated driving is received while in the level 0 control state, and the outside environment at that time is a predetermined environment (e.g., the vehicle is traveling on a highway), the state transitions to the level 2 control state. Alternatively, if, during automated driving in the level 1 control state, it is detected that the outside environment is the aforementioned predetermined environment, the state automatically transitions to the level 2 control state. The determination of the outside environment may be made by, for example, referring to the current position and the map information, in addition to monitoring results from the periphery monitoring unit including cameras and the like. Functions for staying in the lane, as well as changing lanes in response to objects such as other vehicles in the periphery, are provided in the level 2 control state. If the conditions for maintaining the level 2 control state are lost, the control unit 2 changes the automation state of the vehicle 1 to the level 1 control state. In the level 2 control state, the driver does not need to hold onto the steering wheel (this will be called "hands-off"), and is only required to monitor the surroundings. Thus in the level 2 control state, the driver state detecting camera 41a monitors whether or not the driver is monitoring the outside area, and a warning is output, for example, if the driver is not monitoring the outside area sufficiently.

The level 3 control state is the automated driving control state directly above the level 2 control state. The state can transition to the level 3 control state from the level 2 control state, but cannot skip the level 2 control state and transition directly from the level 0 control state or the level 1 control state. The transition to the level 3 control state is not made using an instruction from the driver as a trigger; rather, the transition is made when the control unit 2 has determined through automatic control that certain conditions are satisfied. For example, if, during automated driving in the level 2 control state, the vehicle encounters traffic and follows the vehicle in front at a low speed, the state switches from the level 2 control state to the level 3 control state. In this case, the determination is made on the basis of outputs from the periphery monitoring unit such as cameras, the vehicle speed, and so on. When the conditions for the level 2 control state are satisfied, e.g., when the vehicle is traveling on a highway, the automated driving control state transitions between the level 2 control state and the level 3 control state. In the level 3 control state, the driver is neither required to grip the steering wheel nor required to monitor the surroundings. However, a situation where the driver is required to take over the driving can arise at any time and in any control state. Thus to determine whether the driver will take over the driving correctly, for example, whether the driver's line of sight is within a set range (e.g., facing the navigation or meter display units) is continually monitored and detected during automated driving. The state of the driver may be monitored in this manner during manual driving as well.

The automated driving state control unit 130 determines the automated driving control state on the basis of driver operations made using the aforementioned constituent elements of the driving operation system, events determined by the behavior plan generating unit 144, travel states determined by the track generating unit 146, and so on, and causes the control state to transition to the determined control state as indicated by the white arrows in FIG. 4. The HMI control unit 170 is notified of the automated driving control state. In all of the control states, the automated driving can be overridden to switch to manual driving in response to operations made using the constituent elements of the driving operation system.

The self-vehicle position recognizing unit 140 of the automated driving control unit 120 recognizes the lane in which the self-vehicle 1 is traveling (a traveled lane) and the position of the self-vehicle 1 relative to the traveled lane (or the current line of travel) on the basis of the high-precision map information 182 stored in the storage unit 180 and information input from the LiDAR 42, the radar 43, the cameras 41, the navigation apparatus 50, or the vehicle sensors 60.

The self-vehicle position recognizing unit 140 recognizes the traveled lane by, for example, comparing a pattern of road segment lines recognized from the high-precision map information 182 (e.g., sequences of solid lines and broken lines) with a pattern of road segment lines, in the periphery of the self-vehicle 1, which have been recognized from images captured by the cameras 41. The position of the self-vehicle 1 obtained from the navigation apparatus 50, processing results from an inertial guidance system (if provided), and so on may be taken into account in this recognition as well. The travel control unit 160 controls the travel drive power output apparatus 6, the steering apparatus 3, and the braking apparatus 220 so that the self-vehicle 1 passes through the track generated by the track generating unit 146 at the expected time. The HMI control unit 170 causes the display apparatus 92 to display video and images, causes the speaker 91 to output audio, and so on. The travel control unit 160 determines a steering angle for the automated driving in accordance with the behavior plan information 186 (the system steering angle) and inputs that steering angle to the steering apparatus 3 to cause steering control to be carried out, for example. Note that curves in the lanes and so on during travel can be recognized from, for example, the high-precision map information 182, the outside environment recognizing unit 142 (described next), and so on.

The outside environment recognizing unit 142 recognizes a state of the positions of objects such as surrounding vehicles, as well as the speeds, accelerations, and so on thereof, on the basis of the information input from the cameras 41, the LiDAR 42, the radar 43, and so on. In addition to the surrounding vehicles, the outside environment recognizing unit 142 may recognize the positions of other objects, such as guard rails, telephone poles, parked vehicles, pedestrians, and so on.

The behavior plan generating unit 144 sets a starting point of the automated driving and/or the destination of the automated driving. The starting point of the automated driving may be the current position of the self-vehicle 1, or may be the point at which an operation instructing the automated driving was made. The behavior plan generating unit 144 generates a behavior plan for the section between the starting point and the destination of the automated driving. Note that the configuration is not limited thereto, and the behavior plan generating unit 144 may generate a behavior plan for any desired section.

The behavior plan is constituted by, for example, a plurality of events executed in sequence. The "events" include the following, for example: deceleration events that cause the self-vehicle 1 to decelerate; acceleration events that cause the self-vehicle 1 to accelerate; lane keep events that cause the self-vehicle 1 to travel so as not to depart from the traveled lane; lane change events that cause the self-vehicle 1 to change the traveled lane; passing events that cause the self-vehicle 1 to pass the vehicle traveling in front; branching events that cause the self-vehicle 1 to change to a desired lane at a branching point, travel so as not to depart from the currently-travel lane, and so on; merging events for causing the self-vehicle 1 to accelerate/decelerate or change the traveling lane at a merging lane for merging onto a main lane; handover events for transitioning from an automated driving control state to a manual driving control state at a planned endpoint for the automated driving; and so on. The behavior plan generating unit 144 sets a lane change event, a branching event, or a merging event at a location where the target lane determined by the target lane determining unit 110 is to be switched. Information expressing the behavior plan generated by the behavior plan generating unit 144 is stored in the storage unit 180 as the behavior plan information 186.

Setting Target Travel Position

The track generating unit 146 determines the location of a point within a lane to serve as a target, i.e., a target travel position (or a target position), determines a track that connects consecutive target travel positions (also called a "target track", a "target line", or a "target travel line"), and stores this as part of the behavior plan information 186, so as to set the target travel position. If there are no particular objects to be avoided, for example, a position located in the center of the lane currently being traveled (this will also be called a "reference position", a "first reference position", or, taken as a line constituted by a series of points, a "first reference line") is selected as the target position. If there is an obstruction, the target position is set so as to avoid that obstruction. Even if there is no obstruction in the lane being traveled, a target position which distances the vehicle from a vehicle traveling in the adjacent lane may be set in order to reduce the emotional burden on the driver, occupants, or the like. Furthermore, in curves, the target position may be set further inside than the center of the lane in order to reduce the curvature of the travel positions to maintain a level of comfort. The switching control unit 150 switches between the automated driving control state and the manual driving control state on the basis of a signal input from the automated driving change switches 93.

Furthermore, the target position may also be set on the basis of a history of past override operations. For example, with respect to steering, if an override operation is made in the direction of the center of the lane from the travel line set by the automated driving, the fact that that operation was made is stored. Then, that stored information is referred to when setting the target position, and if that override operation is being carried out, during offset travel for shifting the target position from the center of the lane, the set target position is changed to reduce the amount of the shift from the center. Alternatively, such a target position may be set from the outset. Doing so reduces the opportunities for the driver to intervene.

Additionally, the switching control unit 150 switches from automated driving (the level 3 to level 1 control states) to manual driving (the level 0 control state) on the basis of the brake pedal 7B being operated. In the present example, when a braking operation is made, the switching control unit 150 switches from the automated driving control state to the manual driving control state after providing a postponement time and a warning in accordance with the automation control state at that time. With respect to steering operations, acceleration operations, and so on, override control is carried out according to the manual operation while maintaining the automated driving. Here, if, for example, the steering operation amount exceeds a predetermined override threshold as a result of the override control, travel control is carried out so that it seems that the driving has been switched to manual driving. The override control will be described next.

Override Control

Figure 5A:
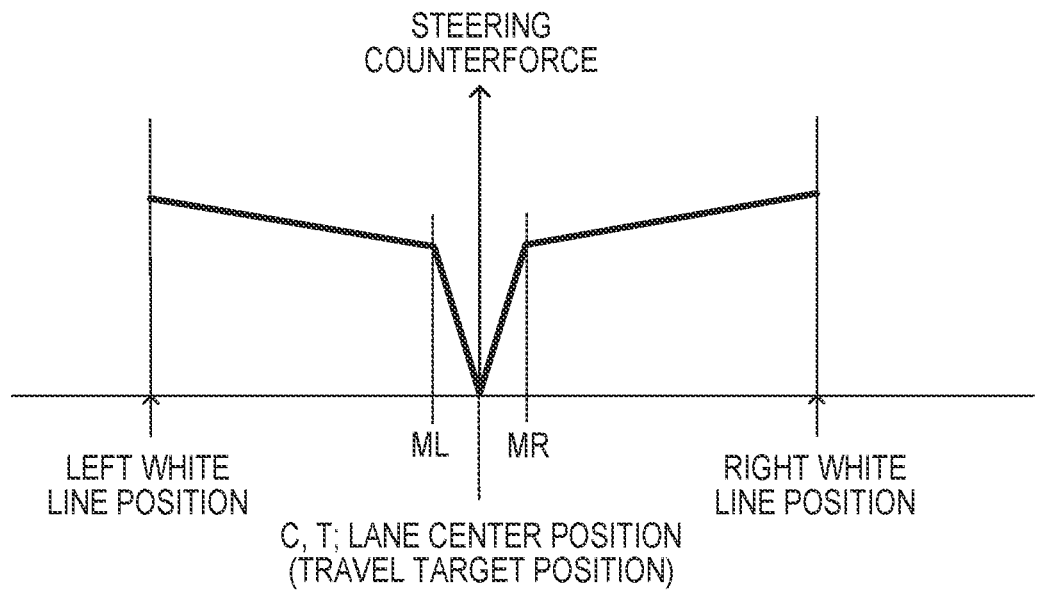
FIGS. 5A and 5B are schematic diagrams illustrating the switching of counterforce characteristics for each of travel positions in a lane width direction.

Override control according to the present embodiment, and particularly steering override control, will be described next. First, however, the characteristics of steering control in automated driving will be described with reference to FIGS. 5A and 5B. FIG. 5A is a diagram illustrating route maintenance characteristics resulting from automated driving. This control image expresses characteristics for attempting to maintain a route as, for example, the cross-sectional shape of a road. In this control image, the height direction can be read as expressing the strength of control for staying at the center of the lane. Of course, these drawings do not indicate the actual cross-sectional shape of the road, and are merely illustrations for describing the characteristics using the shape an analogy. Although not illustrated in FIGS. 5A and 5B, an intermediate control state may be provided as well.

FIG. 5A illustrates an example of a target position set when there are no particular objects or the like to be avoided. The traveled lane is located between a left white line position and a right white line position, and a target position T coincides with a lane center position C. In this case, a counterforce profile with a relatively high steering counterforce is set in the ranges of predetermined widths ML and MR to the left and right, respectively, of the target position T. This makes it difficult to make an override, which suppresses shifting from the target position caused by overrides. A profile with a weaker counterforce is set in the parts of the lane outside the positions ML and MR. This ensures that manual operations which are clearly intended to deviate from the target position are not interfered with. As illustrated in FIG. 5, a position corresponding to a component in the lateral direction of the road in particular will be called a "lateral position". In the present embodiment, even when the term "position" alone is used, that "position" refers to the lateral position in situations where, based on the context, the component in the lateral direction of the road is being discussed.

Figure 5B:
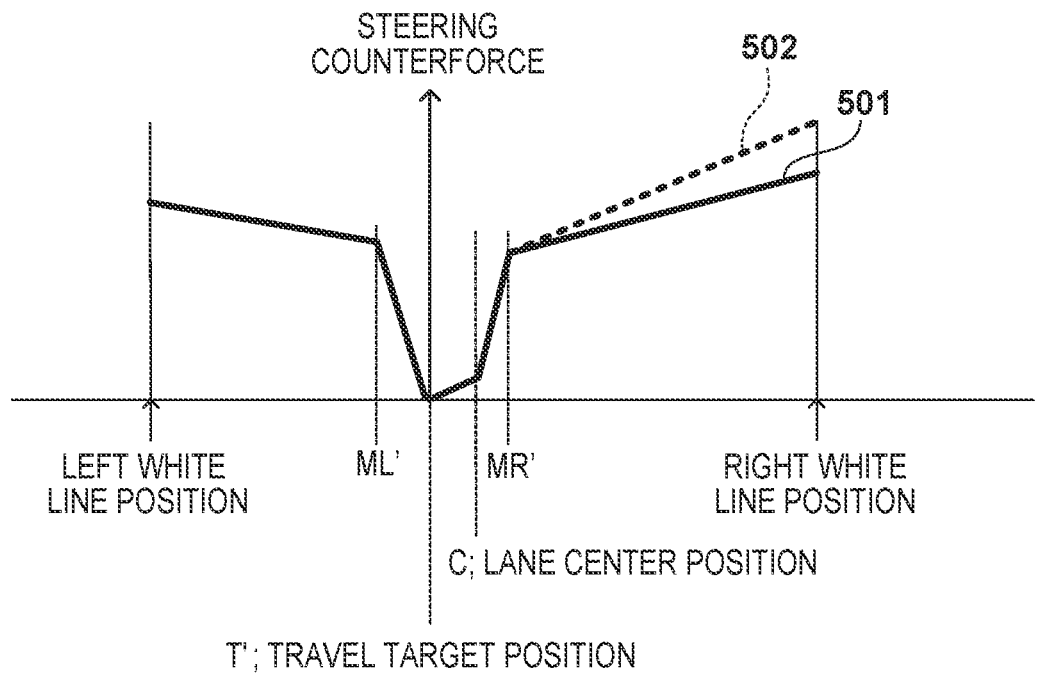

FIG. 5B illustrates an overview of the setting of the counterforce profile during what is known as "offset travel", where the target position is shifted from the lane center position. However, FIG. 5B is an example of a case where there are no obstructions in the lane being traveled. When there is an obstruction in the lane being traveled and offset travel is to be carried out to avoid the obstruction, the same profile as that illustrated in FIG. 5A is employed, aside from the center position C and a target position T' being shifted from each other. This is because in such a case, it is dangerous to deviate from the target travel position set by the automated driving. In FIG. 5B, in the area to the left of the target position T', a setting is made so that it is more difficult to make an override, in the same manner as in FIG. 5A. However, counterforce characteristics which provide a lower counterforce than on the left side of the target position T' are set between the target position T' and the center position C, which makes it relatively easy to make an override operation for returning to the center position. The same counterforce profile as that set between the target position T and the right predetermined position MR in FIG. 5A is applied to override operations for moving past the lane center position C to the right, however. This makes it difficult to move further to the right than the center position C. Furthermore, when a position MR' is passed, a counterforce profile 501, which reduces the counterforce, is applied, in the same manner as in FIG. 5A. However, even in this case, if an obstruction is detected further to the right of the right white line position, which serves as the lane boundary, a counterforce profile 502, which produces a greater counterforce, may be set.

Figure 6A:
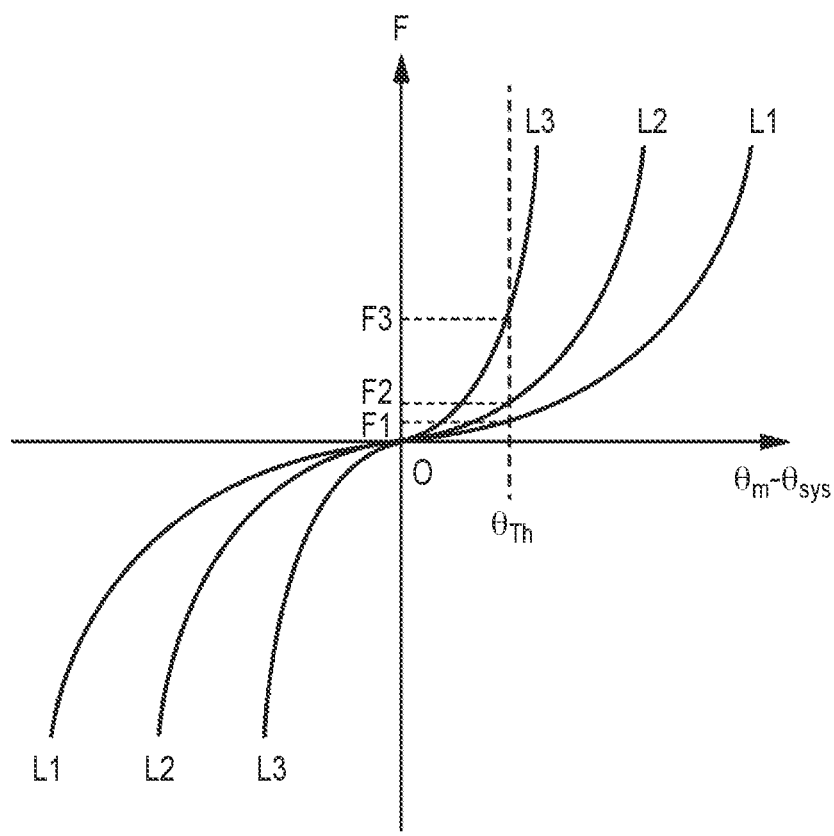
FIGS. 6A and 6B are diagrams illustrating a steering wheel counterforce characteristic profile.
Figure 6B:
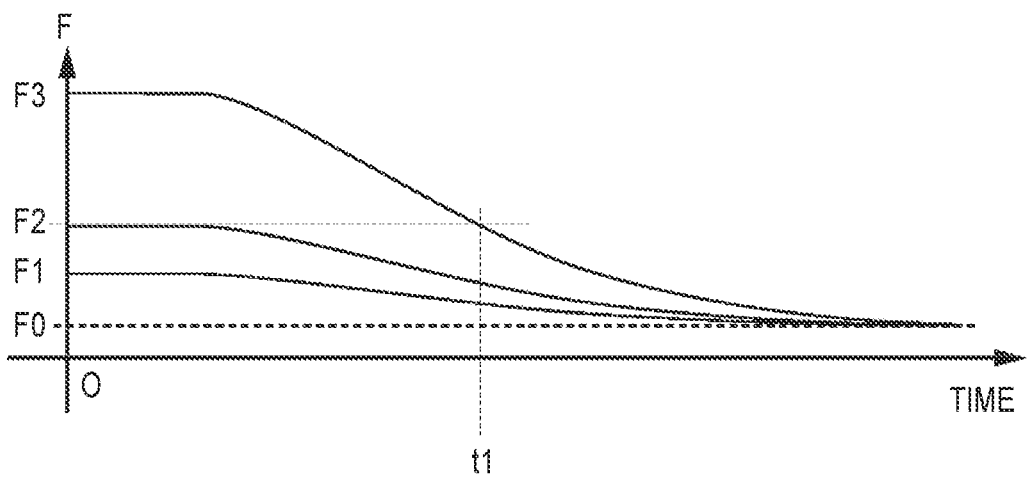

FIGS. 6A and 6B illustrate the characteristics of the steering counterforce for realizing such control. In FIG. 6A, the vertical axis represents the steering counterforce, and the horizontal axis represents a difference ($\theta m - \theta sys$) between a system steering angle $\theta sys$ for maintaining the target position (and a target lateral position in particular) and a manual steering angle θm set manually. Curves L1, L2, and L3 represent steering counterforce characteristic curves (also called "counterforce profiles"). For example, if the driver makes a steering operation when the system steering angle is θsys, the steering counterforce setting unit 210M increases the steering counterforce along the curve L3, and the counterforce motor 210E increases the counterforce in accordance with the curve L3, as the angle difference θm−θsys increases. The curves L1, L2, and L3 may be discrete values as long as they have the characteristics illustrated here. Steering operations made by the driver must be made against that steering counterforce. For example, if the angle difference θm−θsys is θTh, a counterforce F3 is produced when the set counterforce profile is L3, a counterforce F2 is produced when the set counterforce profile is L2, and a counterforce F1 is produced when the set counterforce profile is L1. In this manner, the steering counterforce produced differs depending on the set counterforce profile, even if the steering angle difference is the same.

FIG. 6B illustrates an example of transition characteristics. As will be described later, the counterforce profile is set in accordance with the current vehicle position relative to the target position T, the center position C, and so on. In other words, the counterforce profile is switched during travel. For example, as illustrated in FIG. 6A, if the counterforce profile is switched from L3 to L2 while the steering angle difference remains at θTh, the steering counterforce will change from F3 to F2 and the steering will suddenly become easier as a result. Transition characteristics such as those illustrated in FIG. 6B are applied in this manner when changing the counterforce profile so that an excessive operation will not be elicited from the driver. For example, when the counterforce profile is changed from L3 to L2 with the steering angle remaining at θTh, the steering ECU 21 continuously changes the generated steering counterforce from F3 to F2 over a time t1, as illustrated in FIG. 6B. Even if the profile is changed to yet another profile during this period, the steering counterforce is changed continuously in accordance with the transition characteristics, from the steering counterforce produced at the point in time of the switch to the steering counterforce produced according to the new profile.

In this manner, the counterforce profile information 210P holds a table in which steering counterforces are associated with the angle differences (θm−θsys) between the system steering angle θsys and the manual steering angle θm for each automated driving control state, as illustrated in FIG. 6A, and a table of the transition characteristics, as illustrated in FIG. 6B. The steering counterforce setting unit 210M then sets the counterforce profile according to the sequence illustrated in FIG. 7, for example. The transition characteristics may be set to predetermined values, as per FIG. 6B. In this manner, a steering counterforce based on the steering angle difference and the set counterforce profile is applied.

FIG. 7 illustrates a sequence for setting the counterforce profile, carried out by the steering counterforce setting unit 210M, according to the present embodiment. Although not illustrated in FIG. 3, the steering counterforce setting unit 210M can refer to the current position in the lane as recognized by the self-vehicle position recognizing unit 140 (called the "self-vehicle position" in the following descriptions) and the current target position generated by the track generating unit 146. The sequence of FIG. 7 may, for example, be executed continuously by the steering counterforce setting unit 210M as illustrated in FIG. 7, or may be executed when a trigger for switching the counterforce profile is received, rather than as a repeating loop. In that case, the trigger may be, for example, the self-vehicle position moving across the left predetermined position ML, the target position T, the center position C, and the right predetermined position MR illustrated in FIG. 5.

In FIG. 7, first, it is determined whether the center of the lane coincides with the target position (step S701). If the positions coincide, the self-vehicle position is determined to be on the outside of the left and right predetermined positions of the target position (the profile switch positions corresponding to MR and ML in FIG. 5) (step S703). If the position is on the outside, the counterforce produced with respect to a set steering angle difference is set to the weakest counterforce profile, i.e., L1 (step S707). However, when such is not the case, i.e., when the self-vehicle position is within a predetermined range from the target position, the counterforce produced with respect to a set steering angle difference is set to the strongest counterforce profile, i.e., L3 (step S705). If in step S701 it is determined that the center of the lane and the target position do not coincide, the self-vehicle position is determined to be between the center of the lane and the target position (step S709). When such is the case, the counterforce profile is set to L2 for the side toward the center of the lane and to L3 for the side opposite therefrom (step S711). Referring to FIG. 6A, when, for example, the steering angle difference of the steering from the self-vehicle position toward the center of the lane is positive, a counterforce profile of L2 is set for the positive steering angle difference, and a counterforce profile of L3 is set for a steering angle difference in the opposite direction, i.e., a negative steering angle difference. The opposite is true when the steering angle difference of the steering from the self-vehicle position toward the center of the lane is negative. If it is determined in step S709 that the self-vehicle position is not between the center of the lane and the target position, the process branches to step S703 and the counterforce profile is set in accordance with the self-vehicle position.

By setting the counterforce profile as described above, the counterforce produced can be weakened for override operations made from the target position toward the center of the lane, as illustrated in FIG. 5B, for example. Note that the counterforce profile L2 may be set in step S711. Even if L2 is set, the counterforce profile is switched according to the positional relationship between the self-vehicle position and the left predetermined position ML, the target position T, the center position C, the right predetermined position MR, and so on, and thus a counterforce profile switch such as that illustrated in FIG. 5B can be realized.

Second Embodiment

FIG. 8 illustrates a sequence for setting the counterforce profile, employed instead of that illustrated in FIG. 7. The sequence of FIG. 8 is a sequence for realizing the counterforce characteristics 502 with respect to an obstruction, as described with reference to FIG. 5B. Parts that are the same as in FIG. 7 will not be described. If it is determined in step S703 that the self-vehicle position is outside the left and right predetermined positions MR and ML, it is determined whether there is an obstruction, such as another vehicle, in a position a predetermined distance to the outside of the lane in which the self-vehicle is traveling (step S801). If there is no such obstruction, the counterforce profile L1 is set (step S707). However, if there is such an obstruction, the counterforce profile L2, which has a greater counterforce with respect to a set steering angle than the counterforce profile L1, is set (step S803). Doing so makes it difficult for the driver to make an override operation that moves the vehicle closer to the obstruction. Note that the determination of the obstruction can be made on the basis of information obtained from the outside environment recognizing unit 142, for example.

Summary of Embodiments

The embodiments described above can be summarized as follows.

(1) A first aspect of the present invention provides a vehicle control apparatus that carries out driving assistance or automated driving of a self-vehicle. The apparatus includes a setting unit that, on the basis of a result of monitoring the surroundings, sets a target position, the target position being a travel route within a lane currently being traveled, and a steering control unit that carries out steering control on the basis of the target position. The steering control unit: can accept a steering input resulting from a manual operation made by a driver, even when steering control is being carried out on the basis of the target position; generates a predetermined counterforce against the manual operation when the steering input has been accepted; and controls steering counterforce characteristics so that when the target position is distanced, in a width direction of the lane, from a first reference position that is near the center of the lane in which the self-vehicle is traveling, the steering counterforce against a manual operation in a first direction from the target position toward the first reference position is lower than the steering counterforce against a manual operation in a second direction different from the first direction with respect to a manual operation at a given steering angle when the steering input has been accepted.

According to this configuration, the steering counterforce is reduced when eliminating an offset in the direction of the center position, which makes it possible to better suppress a situation where the vehicle departs the road in response to an erroneous intervention toward the opposite side, while also improving the ease with which a user can intervene.

(2) According to a second aspect of the present invention, the vehicle control apparatus according to (1) is provided, wherein the steering counterforce characteristics are characteristics between the steering counterforce and a steering angle difference, the steering angle difference being a difference between a steering angle based on the target position and a steering angle resulting from a manual operation, and the steering counterforce increases as the steering angle difference increases.

According to this configuration, the counterforce characteristics are defined as a slope, and the driver can intuitively understand by using characteristics that increase/reduce the counterforce each time the steering angle increases.

(3) According to a third aspect of the present invention, the vehicle control apparatus according to (2) is provided, wherein the steering counterforce characteristics in the first direction are such that a rate of increase in the steering counterforce with respect to the steering angle difference from the target position to the first reference position is lower than a rate of increase in the steering counterforce with respect to a steering angle difference past the first reference position.

According to this configuration, when the counterforce is increased further having passed through the center position, a normal counterforce is applied, which makes it possible to generate an appropriate counterforce for excessive intervening operations made by the user.

(4) According to a fourth aspect of the present invention, the vehicle control apparatus according to (2) or (3) is provided, wherein the steering control unit controls the steering counterforce characteristics on the basis of a result of monitoring the surroundings so that the steering counterforce with respect to a steering input in a direction away from the target position is greater when approaching an obstruction than when not approaching an obstruction.

According to this configuration, a situation where the vehicle approaches an obstruction can be suppressed by increasing the steering counterforce when approaching an obstruction.

(5) According to a fifth aspect of the present invention, the vehicle control apparatus according to any one of (2) to (4) is provided, wherein on the basis of the result of monitoring the surroundings, the setting unit carries out first offset control that sets the travel position to be distanced from an obstruction, and carries out second offset control that sets the travel position so as to be distanced from the first reference position on the basis of a curvature of the lane currently being traveled; and the steering control unit controls the steering counterforce characteristics so that a rate of increase in the steering counterforce with respect to the steering angle difference in the first direction when the second offset control is carried out is lower than a rate of increase in the steering counterforce with respect to the steering angle difference in the first direction when the first offset control is carried out.

According to this configuration, a risk with respect to an obstruction can be expressed by the counterforce characteristics, by using a low counterforce when eliminating an offset in curves and using a high counterforce when eliminating an offset with respect to obstructions.

(6) According to a sixth aspect of the present invention, the vehicle control apparatus according to any one of (1) to (5) is provided, wherein when setting a new target position when the steering control unit has caused the steering counterforce to be produced, the setting unit sets the new target position so as to reduce a shift from the first reference position.

According to this configuration, when an operation for eliminating an offset is greater than or equal to a predetermined amount, the driver's preferences can be reflected by eliminating subsequent offsets or the current offset.

The invention is not limited to the foregoing embodiments, and various variations/changes are possible within the spirit of the invention.

What is claimed is:

1. A vehicle control apparatus that carries out driving assistance or automated driving of a self-vehicle, the apparatus comprising:

a setting unit that, on the basis of a result of monitoring the surroundings, sets a target position, the target position being on a travel route within a lane currently being traveled; and a steering control unit that carries out steering control on the basis of the target position, wherein the steering control unit:

can accept a steering input resulting from a manual operation made by a driver, even when steering control is being carried out on the basis of the target position;

generates a predetermined counterforce against the manual operation when the steering input has been accepted; and controls steering counterforce characteristics so that when the target position is distanced, in a width direction of the lane, from a first reference position that is near the center of the lane in which the self-vehicle is traveling, the steering counterforce against a manual operation in a first direction from the target position toward the first reference position is lower than the steering counterforce against a manual operation in a second direction different from the first direction with respect to a manual operation at a given steering angle when the steering input has been accepted, wherein the steering counterforce characteristics in the first direction are such that a rate of increase in the steering counterforce with respect to the steering angle difference from the target position to the first reference position is lower than a rate of increase in the steering counterforce with respect to a steering angle difference past the first reference position.

2. The vehicle control apparatus according to claim 1, wherein the steering counterforce characteristics are characteristics between the steering counterforce and a steering angle difference, the steering angle difference being a difference between a steering angle based on the target position and a steering angle resulting from a manual operation, and the steering counterforce increases as the steering angle difference increases.

3. The vehicle control apparatus according to claim 2, wherein the steering control unit controls the steering counterforce characteristics on the basis of a result of monitoring the surroundings so that the steering counterforce with respect to a steering input in a direction away from the target position is greater when approaching an obstruction than when not approaching an obstruction.

4. The vehicle control apparatus according to claim 2,
wherein on the basis of the result of monitoring the surroundings, the setting unit carries out first offset control that sets the target position to be distanced from an obstruction, and carries out second offset control that sets the target position so as to be distanced from the first reference position on the basis of a curvature of the lane currently being traveled; and the steering control unit controls the steering counterforce characteristics so that a rate of increase in the steering counterforce with respect to the steering angle difference in the first direction when the second offset control is carried out is lower than a rate of increase in the steering counterforce with respect to the steering angle difference in the first direction when the first offset control is carried out.

5. The vehicle control apparatus according to claim 1, wherein when setting a new target position when the steering control unit has caused the steering counterforce to be produced, the setting unit sets the new target position so as to reduce a shift from the first reference position.

* * * * *